(12) United States Patent
Saha

(10) Patent No.: US 12,388,613 B2
(45) Date of Patent: Aug. 12, 2025

(54) SELECTIVE LOCATION-BASED ACTIVATION OF CHANNEL QUALITY INDICATION REPORTING FOR USER EQUIPMENT

(71) Applicant: DISH Wireless L.L.C., Littleton, CO (US)

(72) Inventor: Sougata Saha, Aurora, CO (US)

(73) Assignee: DISH Wireless L.L.C., Littleton, CO (US)

( * ) Notice: Subject to any disclaimer, the term of this patent is extended or adjusted under 35 U.S.C. 154(b) by 504 days.

(21) Appl. No.: 17/704,448

(22) Filed: Mar. 25, 2022

(65) Prior Publication Data

US 2023/0308251 A1  Sep. 28, 2023

(51) Int. Cl.
H04L 5/00 (2006.01)

(52) U.S. Cl.
CPC .......... *H04L 5/0098* (2013.01); *H04L 5/0037* (2013.01); *H04L 5/0053* (2013.01)

(58) Field of Classification Search
CPC ... H04L 5/0098; H04L 5/0037; H04L 5/0053; H04L 1/0027; H04L 1/0026; H04W 24/04; H04W 24/10; H04W 64/00
See application file for complete search history.

(56) References Cited

U.S. PATENT DOCUMENTS

| | | | | |
|---|---|---|---|---|
| 8,600,401 B2 * | 12/2013 | Kumar | ................ | H04W 64/00 370/328 |
| 8,682,255 B2 * | 3/2014 | Rubin | ................ | H04W 24/08 455/67.11 |
| 9,596,696 B1 * | 3/2017 | Sevindik | ............... | H04W 72/30 |
| 9,985,743 B2 * | 5/2018 | Love | ..................... | H04L 5/0057 |
| 10,447,454 B2 * | 10/2019 | Kim | ..................... | H04L 5/0057 |
| 10,660,075 B2 * | 5/2020 | Liu | ..................... | H04W 72/02 |

(Continued)

FOREIGN PATENT DOCUMENTS

| WO | 2017/124323 A1 | 7/2017 |
|---|---|---|
| WO | 2022/032630 A1 | 2/2022 |

OTHER PUBLICATIONS

International Search Report and Written Opinion for PCT/US2023/015852 mailed Jun. 19, 2023, all pages.

*Primary Examiner* — Noel R Beharry
*Assistant Examiner* — Wilfred Thomas
(74) *Attorney, Agent, or Firm* — Kilpatrick Townsend & Stockton LLP

(57) ABSTRACT

Techniques are described for reducing channel quality indication (CQI) reporting by user equipment (UEs) by selectively triggering the UEs to report CQI based at least on present physical location. UEs are controllable by base stations to toggle between active and inactive CQI reporting modes (inactive being the default mode). By default, base stations can make channel-state-based determinations based on previously reported CQI information stored as location-mapped CQI entries. Base stations can monitor the physical locations of UEs to determine when they are in locations with stale location-mapped CQI entries. If a UE is detected as being in such a location, a base station can direct the UE to toggle into active CQI reporting mode, thereby causing the UE to compute its CQI and transmit a CQI report. The base station can use the reported information to update the CQI score of the location-mapped CQI entry for that location.

21 Claims, 3 Drawing Sheets

(56) References Cited

U.S. PATENT DOCUMENTS

| | | | |
|---|---|---|---|
| 2007/0259671 A1* | 11/2007 | Cheng | H04L 1/20 455/452.2 |
| 2010/0329134 A1* | 12/2010 | Doppler | H04L 1/0029 370/252 |
| 2012/0163208 A1* | 6/2012 | Kamble | H04L 41/5032 370/252 |
| 2012/0300661 A1* | 11/2012 | Asplund | H04W 72/542 370/252 |
| 2013/0052959 A1* | 2/2013 | Rubin | H04W 24/08 455/67.11 |
| 2013/0053055 A1* | 2/2013 | Kumar | G01S 5/02521 455/456.1 |
| 2013/0077581 A1* | 3/2013 | Lee | H04W 72/542 370/329 |
| 2013/0315120 A1* | 11/2013 | Yu | H04L 1/0036 370/311 |
| 2014/0314030 A1* | 10/2014 | Wang | H04L 1/0026 370/329 |
| 2015/0018016 A1* | 1/2015 | Zhang | H04W 64/00 455/456.3 |
| 2015/0079981 A1* | 3/2015 | Zhu | H04W 24/08 455/434 |
| 2015/0092708 A1* | 4/2015 | Su | H04W 76/16 370/329 |
| 2016/0043828 A1* | 2/2016 | Love | H04B 7/066 |
| 2016/0261393 A1* | 9/2016 | Chen | H04W 72/542 |
| 2016/0352398 A1* | 12/2016 | Chen | H04B 7/084 |
| 2019/0166575 A1* | 5/2019 | Van Phan | G01S 1/00 |
| 2020/0136749 A1* | 4/2020 | Lin | H04L 1/0017 |
| 2020/0221384 A1* | 7/2020 | Ang | H04W 52/0229 |
| 2021/0235302 A1* | 7/2021 | Chande | H04W 24/10 |
| 2023/0085174 A1* | 3/2023 | Jayaram | G01S 19/46 455/456.6 |
| 2024/0014983 A1* | 1/2024 | Ratasuk | H04L 1/1896 |
| 2024/0031041 A1* | 1/2024 | Jung | H04B 17/15 |
| 2024/0031054 A1* | 1/2024 | Bai | H04L 5/0053 |
| 2024/0129755 A1* | 4/2024 | Jeon | G06N 3/044 |

\* cited by examiner

SELECTIVE LOCATION-BASED ACTIVATION OF CHANNEL QUALITY INDICATION REPORTING FOR USER EQUIPMENT

FIELD

Embodiments relate to cellular communication networks, and, more particularly, to selective location-based activation of channel quality indication reporting for user equipment.

BACKGROUND

In many modern cellular communication networks, fixed base stations allocate and manage communication resources for mobile terminals. Such radio base stations are often mounted in fixed locations, such as on cellular towers, buildings, etc. and provide network coverage to mobile terminals (e.g., cellphones) in a corresponding coverage area. While a mobile terminal is in use, it is desirable to maintain sufficiently high channel quality between the base station and the mobile terminal, such as to provide high signal to noise ratio, high throughput, low data loss, etc. As mobile terminals move, however, the channel quality can be highly dynamic. For example, signal to noise ratio can change by a large amount in a relatively short time when a mobile device moves from an outdoor area to an indoor area, or the like.

Thus, channel quality is typically maintained, at least in part, by exchanging current channel state information between the base stations and the mobile terminals, and by updating resource scheduling responsively. The manner of communicating such channel state information, the types of channel state information exchanged, and other parameters are defined by technical specifications promulgated by standard setting organizations. For example, Technical Specification 38.1014, version 15.1.0, Release 15, produced by the Third Generation Partnership Project (3GPP), defines various minimum performance requirements for user equipment (UE) in a fifth generation (5G) new radio (NR) network, including certain requirements for reporting channel quality indicator (CQI) information. Such communication standards tend to specify substantially constant CQI reporting from UEs (e.g., mobile terminals) to base stations to make sure that resource scheduling decisions are being made by the base stations based on the most updated CQI data for active UEs in base station coverage areas. For example, according to some conventional standards, mobile terminals may decode channel information and transmit an updated CQI report to a base station every millisecond.

While such constant CQI reporting can help improve resource scheduling and/or provide other features for the network, the reporting can also consume channel resources, such as uplink resources. Conventional approaches to CQI reporting tend to assume that it is preferable to keep the base stations maximally updated with channel state information, even at the expense of some throughput to the UE. In some scenarios, however, such as when a UE is in a location with poor channel quality (e.g., poor reception), further reductions in throughput caused by constant CQI reporting can noticeably degrade performance of the UE.

SUMMARY

Embodiments relate to reducing channel quality indication (CQI) reporting by user equipment (UEs) by selectively triggering the UEs to report CQI based at least on present physical location. UEs are controllable by base stations to toggle between active and inactive CQI reporting modes (inactive being the default mode). By default, base stations can make channel-state-based determinations based on previously reported CQI information stored as location-mapped CQI entries. Base stations can monitor the physical locations of UEs to determine when they are in locations with stale location-mapped CQI entries. If a UE is detected as being in such a location, a base station can direct the UE to toggle into active CQI reporting mode, thereby causing the UE to compute its CQI and transmit a CQI report. The base station can use the reported information to update the CQI score of the location-mapped CQI entry for that location.

According to one set of embodiments, a system is provided for implementation in a base station for selective location-based activation of channel quality indication (CQI) reporting by mobile terminals in a wireless communication network. The system includes: a user equipment (UE) location monitor, a mapping database, and a CQI reporting controller. The UE location monitor is to detect a present physical location of a mobile terminal of a plurality of user equipment (UE) devices in communication with the base station, each of the plurality of UE devices configured to be toggled by the base station into either of an active CQI reporting mode or an inactive CQI reporting mode. The mapping database has, stored thereon, a plurality of location-mapped CQI entries, each being a mapping between a respective CQI reporting location and a respective CQI score generated from respective CQI information previously reported by one or more UE devices while in the respective CQI reporting location. The CQI reporting controller is coupled with the UE location monitor and the mapping database to: match the present physical location to a particular location-mapped CQI entry of the plurality of location-mapped CQI entries; determine whether the respective CQI score of the particular location-mapped CQI entry is stale; communicate a control message to the mobile terminal to toggle the mobile terminal to the active CQI reporting mode in response to the staleness detector determining that the respective CQI score of the particular location-mapped CQI entry is stale; and receive a CQI reporting message from the mobile terminal, responsive to the mobile terminal toggling to the active CQI reporting mode, the CQI message indicating a present spectral efficiency experienced by the mobile terminal at the present physical location. In some such embodiments, the CQI reporting controller is further to update the respective CQI score for the particular location-mapped CQI entry based on the CQI reporting message.

According to another set of embodiments, a method is provided for selective location-based activation of channel quality indication (CQI) reporting by mobile terminals in a wireless communication network having a plurality of base stations. The method includes: detecting, by a base station of the plurality of base stations, a present physical location of a mobile terminal of a plurality of user equipment (UE) devices in communication with the base station, each of the plurality of UE devices configured to be toggled by the base station into either of an active CQI reporting mode or an inactive CQI reporting mode; matching the present physical location, by the base station, to a particular location-mapped CQI entry of a plurality of location-mapped CQI entries stored in a mapping database, each of the plurality of location-mapped CQI entries being a mapping between a respective CQI reporting location and a respective CQI score generated from respective CQI information previously reported by one or more UE devices while in the respective CQI reporting location; determining, by the base station, that the respective CQI score of the particular location-mapped CQI entry is stale; communicating a control message, by the base station to the mobile terminal, to toggle the mobile terminal to the active CQI reporting mode responsive to the determining; and receiving a CQI reporting message, by the base station from the mobile terminal, responsive to the mobile terminal toggling to the active CQI reporting mode, the CQI message indicating a present spectral efficiency experienced by the mobile terminal at the present physical location. In some such embodiments, the method further includes updating the respective CQI score for the particular location-mapped CQI entry based on the CQI reporting message.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
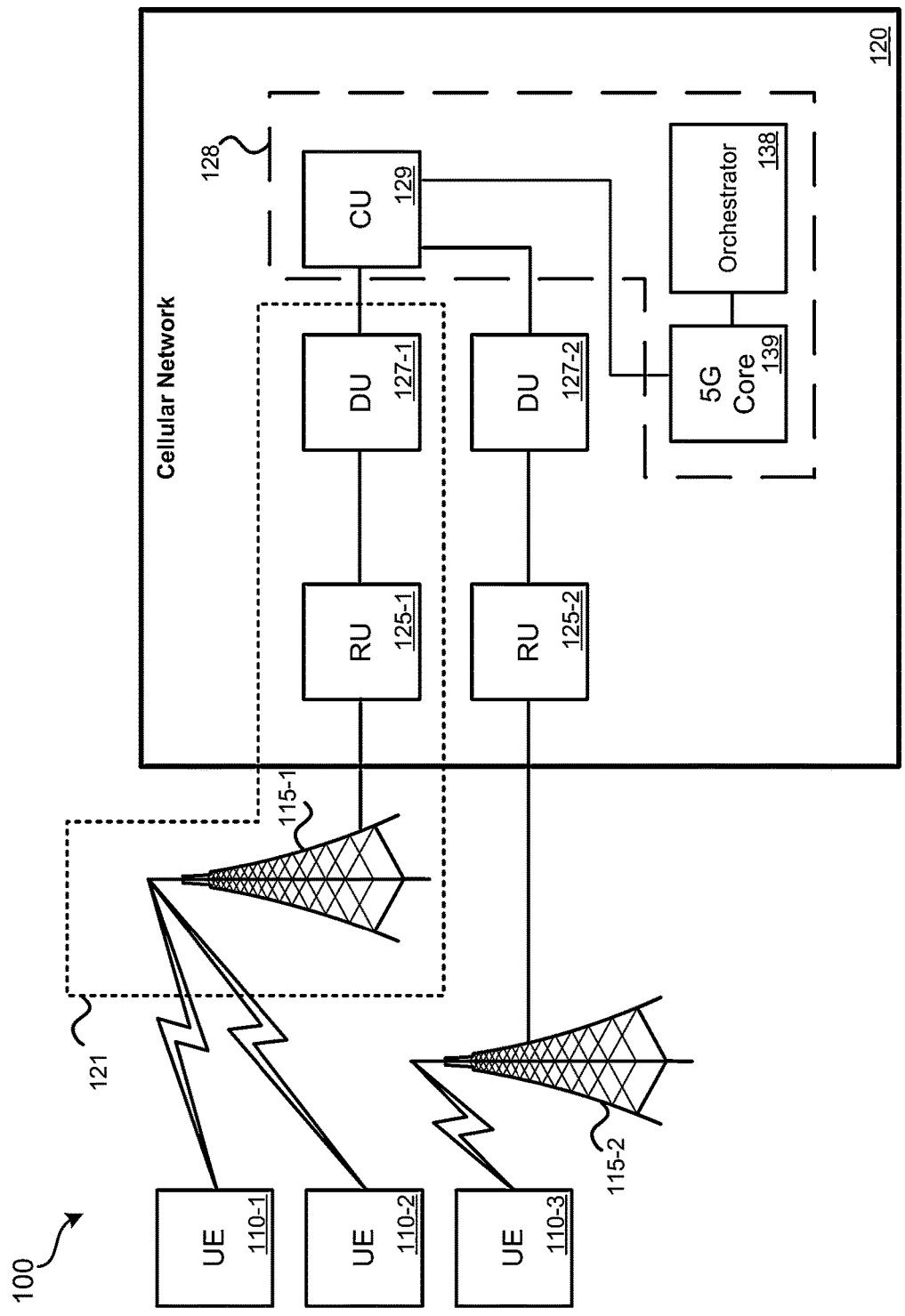
FIG. 1 shows a portion of a conventional radio network system, including a radio access network and a core.

For the sake of context, FIG. 1 shows a portion of a conventional radio network system 100, including a radio access network (RAN) and a core. Some embodiments are described and illustrated in context of a fifth generation (5G) new radio (NR) cellular network and related components. However, features and embodiments described herein can be applied to any suitable radio network, such as a fourth-generation (4G) long-term evolution (LTE) network, a sixth generation (6G) network, etc. The illustrated radio network system 100 includes UEs 110 (UE 110-1, UE 110-2, UE 110-3), base station towers 115, and a cellular network 120. The cellular network 120 includes radio units 125 ("RUs 125"), distributed units 127 ("DUs 127"), a centralized unit 129 ("CU 129"), a 5G core 139, and an orchestrator 138. The illustrated components can be implemented in various ways, and corresponding network functions can be distributed in various ways. For example, in an open radio access network (O-RAN) architecture, components (other than those that transmit and/or receive radiofrequency (RF) signals), can be implemented as software in the cloud. As such, the functionality of such components can be shifted among different servers, for which the hardware may be maintained by a separate cloud-service provider, to accommodate where the functionality of such components is needed or desired. For example, components of the 5G core 139 may be hosted using a cloud service provider.

UE 110 can represent various types of end-user devices, such as smartphones, cellular modems, cellular-enabled computerized devices, sensor devices, gaming devices, access points (APs), any computerized device capable of communicating via a cellular network, etc. Some or all of the UEs 110 can be mobile devices. UE 110 can also represent any type of device that has an incorporated 5G interface, such as a 5G modem. As one example, UE 110-1 is a smartphone with an integrated 5G modem. Depending on the location of individual UEs, UE 110 may use RF to communicate with various base stations towers 115 of cellular network 120. Each base station tower 115 can refer to base station hardware, such as antennas and other base station components, etc., mounted on a radio tower (as illustrated), on a building, or on any other suitable structure.

Each base station tower 115 can include one or more antennas to allow RUs 125 to communicate wirelessly with the UEs 110. RUs 125 can represent an edge of cellular network 120 where data is transitioned to wireless communication. As noted above, the radio access technology (RAT) used by RU 125 may be 5G NR, or any other suitable RAT. The remainder of the cellular network 120 may be implemented based on an exclusive 5G architecture, a hybrid 4G/5G architecture, a 4G architecture, or any other suitable cellular network architecture. A base station can include various base station equipment 121. Base station equipment 121 can include an RU (e.g., RU 125-1) and a DU (e.g., DU 127-1), as well as antennas and/or other supporting equipment. Only two base station towers 115 (115-1 and 115-2) are illustrated, though real-world implementations of radio network system 100 may include many (e.g., thousands) of base station towers 115 and many RUs 125 and DUs 127 (e.g., and possibly also many CUs 129 and/or other components).

One or more RUs, such as RU 125-1, may communicate with DU 127-1. As an example, at a cell site, three RUs 125 may be present, each connected with the same DU 127. Different RUs 125 may be configured for communications using different portions of licensed spectrum. For instance, a first RU 125 may operate on the spectrum in the citizens broadcast radio service (CBRS) band, while a second RU 125 may operate on a separate portion of the spectrum, such as "band 71." One or more DUs 127, such as DU 127-1, may communicate with a particular CU 129. In some embodiments, RUs 125, DUs 127, and CUs 129 are referred to collectively as a "gNodeB," which serves as the radio access network (RAN) portion of the cellular network 120. In 4G LTE embodiments, similar groups of components can be referred to as an "eNodeB."

The CU 129 can communicate with a 5G core 139. The specific architecture of the cellular network 120 can vary by embodiment. In some cases, edge cloud server systems outside of the cellular network 120 may communicate, either directly, via the Internet, or via some other network, with components of the cellular network 120. For example, DU 127-1 may be able to communicate with an edge cloud server system without routing data through CU 129, or 5G core 139. Other DUs 127 may or may not have this capability. The cellular network 120 can include a native 5G core. In some implementations, the 5G core 139 is a cloud-native 5G core, such that a cloud-computing system, for which the physical infrastructure can be maintained by a separate cloud-service provider, can provide the computing and storage capabilities. Such an arrangement can facilitate significant scalability of services.

In a possible O-RAN implementation, DUs 127, CU 129, 5G core 139, and/or orchestrator 138 can be implemented virtually as software being executed by general-purpose computing equipment, such as in a data center. Depending on needs, the functionality of a DU 127, CU 129, and/or 5G core 139 may be implemented locally to each other, and/or specific functions of any given component can be performed by physically separated server systems (e.g., at different server farms). For example, some functions of a CU 129 may be located at a same server facility as where the DU 127 is executed, while other functions are executed at a separate server system. In some embodiments of radio network system 100, CU 129, 5G core 139, and orchestrator 138 are implemented as cloud-based cellular network components 128. In some embodiments, DUs 127 are partially or fully added to cloud-based cellular network components 128. Such cloud-based cellular network components 128 may be executed as specialized software executed by underlying general-purpose computer servers. Cloud-based cellular network components 128 may be executed on a third-party cloud-based computing platform or a cloud-based computing platform operated by the same entity that operates the RAN. A cloud-based computing platform may have the ability to devote additional hardware resources to cloud-based cellular network components 128 or implement additional instances of such components when requested.

Kubernetes, or any other suitable container orchestration platform, can be used to create and destroy the logical DU 127, CU 129, or 5G core 139 units and subunits as needed for the cellular network 120 to function properly. Kubernetes allow for container deployment, scaling, and management. As an example, if cellular traffic increases substantially in a region, an additional logical DU 127, or components of a DU 127 may be deployed in a data center near where the traffic is occurring, without any new hardware being deployed (processing and storage capabilities of the data center would be devoted to the needed functions). When the need for the logical DU 127 or subcomponents of the DU 127 no longer exists, Kubernetes can allow for removal of the logical DU 127. Kubernetes can also be used to control the flow of data (e.g., messages) and inject a flow of data to various components. This arrangement can allow for the modification of nominal behavior of various layers.

The deployment, scaling, and management of such virtualized components can be managed by orchestrator 138. Orchestrator 138 can represent various software processes executed by underlying computer hardware. Orchestrator 138 can monitor cellular network 120 and determine the amount and location at which cellular network functions should be deployed to meet or attempt to meet service level agreements (SLAs) across slices of the cellular network 120. Orchestrator 138 can allow for the instantiation of new cloud-based components of cellular network 120. As an example, to instantiate a new DU 127, orchestrator 138 can perform a pipeline of calling the DU code from a software repository incorporated as part of, or separate from, cellular network 120; pulling corresponding configuration files (e.g., helm charts); creating Kubernetes nodes/pods; loading DU containers; configuring the DU 127; and activating other support functions (e.g., Prometheus, instances/connections to test tools).

A network slice functions as a virtual network operating on cellular network 120. The underlying physical architecture of cellular network 120 can be shared among some number of network slices, such as tens, hundreds, or thousands of network slices. Communication bandwidth and computing resources of the underlying physical network can be reserved for individual network slices, thus allowing the individual network slices to reliably meet particular service level agreement (SLA) levels, quality of experience (QoE) parameters, quality of service (QoS) parameters, etc. By controlling the location and amount of computing and communication resources allocated to a network slice, the SLA attributes for UE on the network slice can be varied on different slices. A network slice can be configured to provide sufficient resources for a particular application to be properly executed and delivered (e.g., gaming services, video services, voice services, location services, sensor reporting services, data services, etc.). Further, particular cellular network slices may include some number of defined layers. Each layer within a network slice may be used to define QoS parameters and other network configurations for particular types of data. For instance, high-priority data sent by a UE 110 may be mapped to a layer having relatively higher QoS parameters and network configurations than lower-priority data sent by the UE 110 that is mapped to a second layer having relatively less stringent QoS parameters and different network configurations.

While FIG. 1 illustrates various components of cellular network 120, other embodiments of cellular network 120 can vary the arrangement, communication paths, and specific components of cellular network 120. Cellular communications involve RF communications between UEs 110 and base stations 115 over RF communication channels. Each base station 115 can service UEs 110 in a corresponding coverage area. As mobile UEs 110 move throughout the coverage areas of a network, the quality of the RF communication channels can change. For example, different portions of a coverage area can be associated with different signal strengths. To help the cellular network 120 provide communication services to the UEs 110 at a desired level (e.g., in satisfaction of SLA, QoE, QoS, and/or other parameters), various types of channel-related information can be communicated over the RF communication channels.

For example, in 5G NR architectures, the base station towers 115 transmit a synchronization signal block (SSB), which can include information about its primary synchronization signal (PSS), secondary synchronization signal (SSS), extended synchronization signal (ESS), physical broadcast channel (PBCH), location, etc. A UE 110 desiring to communicate with the cellular network 120 via a base station tower 115 can receive the SSB, decode the SSB (e.g., in its onboard 5G modem), and calculate a signal to interference and noise ratio (SINR) of the SSB. Such signaling can help the UE 110 determine when to attach to particular cells, such as by facilitating cell search, acquisition of time and frequency synchronization, physical layer cell identification (PCI), etc.

After the UE 110 has decoded the SSB and has determined to attach to a particular cell (e.g., a base station tower 115), the UE 110 can receive a channel state information (CSI) reference signal (RS) from the base station tower 115. In general, the CSI-RS is communicated from the base station tower 115 to the UE 110, and the UE 110 can read and decode the CSI-RS to obtain present information about the state of the channel, including channel quality information. 4G LTE implementations use similar reference signaling, referred to as a cell-specific reference signal (CRS). One primary difference is that, in 5G NR, the CSI-RS can be configured for each individual UE 110 (or multiple users can share the resource); in 4G LTE, the CRS is configured at the per-cell level. The CSI-RS can be used to support a number of functions, such as failure detection for RF communication channels, synchronization with base station towers 115 (e.g., time, frequency, etc.), connected-mode mobility support, and channel or beam management functions. In general, the UE 110 uses the CSI-RS to estimate the RF communication channel and report information about the present quality of the channel back to the cellular network 120 via the base station tower 115. This can involve reporting of certain CSI parameters, such as a layer indicator (LI), precoding type indicator (PTI), precoding matrix indicator (PMI), rank indicator (RI), and channel quality indicator (CQI).

In addition to the CSI-RS on the downlink, the base station tower 115 and other components can evaluate channel condition based on uplink signals. For example, a demodulation reference signal (DMRS) received by a base station tower 115 can indicate an estimate of the RF communication channel between the base station tower 115 and the specific UE 110 originating the uplink signal (e.g., for use in demodulating the associated physical channel). The SINR of the DMRS can indicate channel condition for the specific RF communication channel.

In a typical scenario, the UE 110 reports CQI (and/or other information) to the base station tower 115. CQI is typically represented as an index value (e.g., a scalar value from 0 to 15) that is representative of the downlink (from base station tower 115 to UE 110) RF communication channel quality. The CQI value can represent a highest modulation and coding scheme that can be used to achieve a required block error rate (BLER) under present conditions of the RF channel between the UE 110 and the base station tower 115. In effect, the CQI represents a measure of channel condition from the perspective of the UE 110. The base station tower 115 can then compute channel condition from its perspective (e.g., as SINR of the DMRS). Based on this information, scheduler functions of the base station can determine how best to schedule the channel. For example, the scheduler can choose which modulation and coding scheme to use for communications over the RF channel (e.g., 16 QOM, 64 QOM, 256 QOM, etc.).

The manner of communicating channel state information, the types of channel state information exchanged, and other related parameters are defined by technical specifications promulgated by standard setting organizations. For example, Technical Specification 38.1014, version 15.1.0, Release 15, produced by the Third Generation Partnership Project (3GPP), defines various minimum performance requirements for UE in 5G NR networks, including certain requirements for reporting CQI. Conventional cellular communication standards tend to assume an environment with highly dynamic channel conditions. For example, as mobile UEs 110 move between indoor and outdoor locations, they can experience drastic and relatively rapid changes in channel state. As such, conventional 5G standards tend to require UEs 110 to provide the cellular network 120 with substantially constant updates as to CSI. For example, UEs 110 in 5G NR networks can typically compute and report CQI every millisecond. Even though each CQI report does not involve communicating a large amount of data, the substantially constant reporting of CQI can tend to consume noticeable amounts of throughput. Particularly when the UE 110 is in a location with poor channel quality, the reduction in throughput due to such frequent CQI reporting can appreciably impact performance.

Embodiments described seek to reduce CQI reporting by UE's by selectively triggering the UEs to report CQI based on their location and staleness of previously reported information. Base stations can monitor a UE to determine its present physical location. The UEs are configured to be selectively toggled between an active CQI reporting mode and an inactive CQI reporting mode, which is the default mode. By default, the base station can make scheduling and/or other channel state-related determinations based on assuming the CQI (and/or other CSI) at the present UE location to be the same as previously reported and stored, such that a new CQI report is not needed. For example, a database maintains location-mapped CQI entries that each indicate a respective CQI score representing CQI information previously reported by one or more UEs in connection with a particular CQI reporting location. If a UE is detected to be at a location for which the corresponding stored CQI score is stale, the base station can direct the UE to toggle into active CQI reporting mode. The UE can then report its present CQI, and the base station can update the CQI score for the matched location-mapped CQI entry, accordingly.

Figure 2:
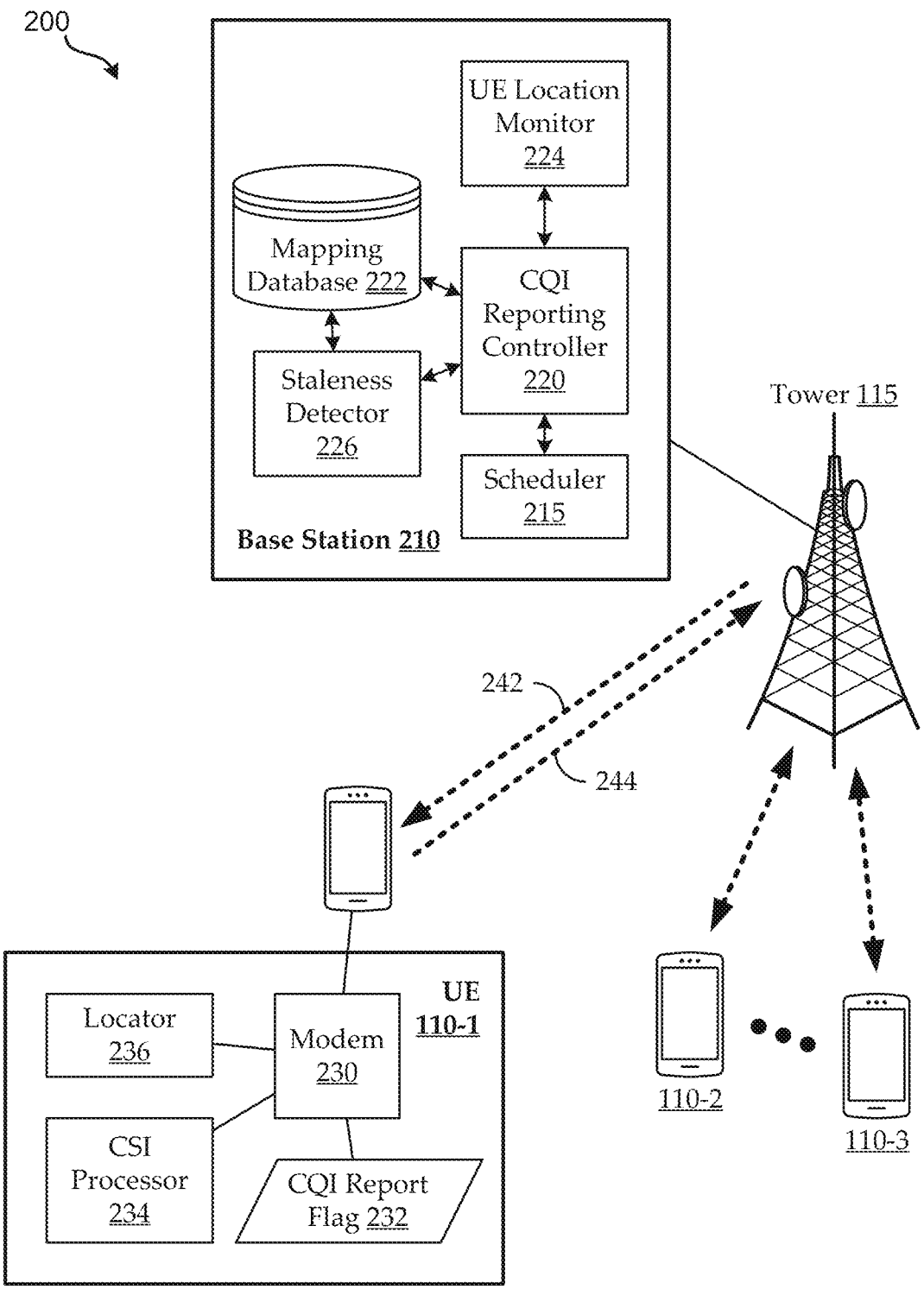
FIG. 2 shows an illustrative portion of a cellular network having user equipment in communication with a base station, according to various embodiments described herein.

FIG. 2 shows an illustrative portion of a cellular network 200 having UEs 110 in communication with a base station 210, according to various embodiments described herein. Only a single base station 210 and base station tower 115 are shown in communication with only a few UEs 110, but a real-world implementation of such a cellular network 200 will tend to have a large number (e.g., thousands) of base stations 210 servicing an even larger number of UEs 110. The base station 210 is illustrated in connection with a base station tower 115, such as described with reference to FIG. 1. To avoid overcomplicating the drawing, the base station 210 is shown as a single box. However, components of the base station 210 can be implemented and/or distributed in any suitable manner in accordance with the cellular network 200 architecture. For example, in context of the conventional 5G NR architecture of FIG. 1, the base station 210 components can be implemented in one or more RUs 125 and/or DUs 127. In such a context, the illustrated base station 210 can be implemented as a gNodeB (gNB), which is generally a base station compliant with 5G NR RAN. In a 4G LTE context, the base station 210 can be implemented as an eNodeB.

Base stations 210 can perform and/or implement network scheduling functions based on CSI, such as CQI reports received from UEs 110. The illustrated implementation of the base station 210 includes a scheduler 215. In other implementations, some or all features of the scheduler 215 are implemented in the 5G core and/or other components of the cellular network 200. Further, in some implementations, each base station 210 has its own scheduler 215 that is locally incorporated into the base station 210, or in communication with the base station 210. In other implementations, a single base station 210 can be in communication with a group of base station towers 115 distributed over a geographical area, and the scheduler 215 of the base station 210 can manage network scheduling functions for some or all of the group of base station towers 115.

A UE 110 can communicate with the cellular network 200 via a base station 210 via one or more RF communication channels, which can generally support downlink 242 and uplink 244 communications. Each UE 110 includes a modem 230 that facilitates such communications. For example, the modem 230 is configured (e.g., hard-coded, programmed, etc.) to be compatible with the RAT, such as with 5G NR. As such, the modem 230 can decode signals received via the downlink 242 from the base station 210, and the modem 230 can encode signals for transmission via the uplink 244 to the base station 210. As described above, both the downlink 242 and the uplink 244 are used to exchange CSI. For example, the base station 210 transmits the CSI-RS on the downlink 242 to a UE 110. The modem 230 of the UE 110 decodes the CSI-RS. A CSI processor 234 uses the decoded CSI-RS to locally determine and compute CSI information. For example, the CSI processor 234 computes a CQI value, such as based on computing a SINR of the CSI-RS. The modem 230 can report the computed CQI value back to the base station 210 via the uplink 244 in accordance with appropriate protocols and/or other RAT standards.

As described with reference to FIG. 1, conventionally configured UE modems, such as those compatible with certain conventional cellular standards, are configured to substantially continually report CQI while operating on the cellular network 200. For example, 5G NR-compatible UE modems can be configured to report CQI to a base station 210 once per millisecond. While such constant CQI reporting can help improve resource scheduling and/or provide other features for the network, the reporting can also consume channel resources, such as uplink resources. Conventional approaches to CQI reporting tend to assume that it is preferable to keep the base stations maximally updated with channel state information, even at the expense of some throughput to the UE. In some scenarios, however, such as when a UE is in a location with poor channel quality (e.g., poor reception), further reductions in throughput caused by constant CQI reporting can noticeably degrade performance of the UE.

According to novel embodiments described herein, the modem 230 is configured to be selectively toggled between an active CQI reporting mode and an inactive CQI reporting mode. The modem configuration can include a CQI report flag 232. Reference to a "flag" herein is intended generally to include any remotely controllable manner of toggling the CQI reporting mode of the modem 230. For example, the CQI report flag 232 can be a bit that can be set to one state (e.g., logic HIGH, '1', or the like) to indicate the active CQI reporting mode, or set to another state (e.g., logic LOW, '0', or the like) to indicate the inactive CQI reporting mode. The CQI report flag 232 can be implemented as an additional flag added to the modem 230 configuration, or as a repurposing of an existing flag of the modem 230 configuration.

Some descriptions herein refer to certain channel-relative properties and measurements (e.g., CQI, CSI, etc.) as relative to a particular location, or the like. Such references are intended to convey such channel-relative properties and measurements for an RF communication channel between the base station 210 and a UE 110 that is positioned at that location. For example, reference to a "CQI index at a particular location," or the like, is intended to convey a "CQI index as is (or would be) computed by a UE when communicating with the base station from the particular location over an RF channel."

The modem 230 can be configured so that the default setting of the CQI report flag 232 corresponds to the inactive CQI reporting mode, so that the UE 110 does not report CQI by default. Responsive to the CQI report flag 232 is toggled to the active CQI reporting mode setting, the UE 110 can generate and transmit a CQI report. In some embodiments, the UE 110 can continue to generate and transmit CQI reports while the CQI report flag 232 is in the active CQI reporting mode setting. In other embodiments, the modem 230 is configured automatically to return to the default inactive CQI reporting mode after any CQI reporting. For example, toggling the CQI report flag 232 to the active CQI reporting mode causes the UE 110 to generate and transmit a single CQI report, after which the CQI report flag 232 automatically toggles back to the inactive CQI reporting mode setting. In other embodiments, the modem 230 is configured to remain in the active CQI reporting mode for a predetermined window. For example, after the CQI report flag 232 is toggled to the active CQI reporting mode setting, the UE 110 generates and transmits a predetermined number of CQI reports, and/or generates and transmits CQI reports over a predetermined time window, after which the CQI report flag 232 automatically toggles back to the inactive CQI reporting mode setting.

The scheduler 215 and/or other base station 210 components perform a number of network functions based on a constantly updated determination of spectral efficiency, CSI, etc. As noted above, conventional approaches tend to update this type of information based in part on the constant CQI reporting from conventional UEs. However, in embodiments described herein, with UEs 110 configured to be set to the inactive CQI reporting mode by default, the scheduler 215 and/or other base station 210 components can primarily rely on stored location-mapped CQI entries, as described herein.

According to embodiments described herein, toggling of the CQI reporting modes for each UE 110 is controlled by the base station 210 based on monitoring present physical locations (geolocation) of the UEs 110. In some embodiments, physical locations of UEs 110 are tracked by the base station 210 using base station positioning (e.g., position fixing) techniques. For example, a base station 210 can use various techniques to estimate a distance of a UE 110 away from a base station 210, or multiple base stations 210 can use such techniques to triangulate an estimated physical location of the UE 110. In other embodiments, GPS positioning, or the like is used. For example, a GPS module on each UE 110 sends location information to a background positioning server, and a base station 210 can attempt to compute the present physical location of the UE 110. GPS positioning tends to provide more accurate geolocation information than base station positioning, but it tends also to use more power, not to work indoors, to provide delayed information, and/or to have other relative limitations.

In some embodiments, each UE 110 can include a locator 236 that keeps track of its present physical location. For example, the locator 236 in the UE 110 can use one or more of global positioning satellite (GPS) data, WiFi location data, cell (e.g., base station tower 115) triangulation data, accelerometer and/or gyroscopic data, etc. to track its physical position. The position can be tracked and recorded as latitude and longitude value pairs, and/or in any other suitable manner. In some UEs 110 the locator 236 is configured to provide emergency location-based service (LBS), which is generally referred to as advanced mobile location (AML). Various services providers offer their different types of AML services that can track mobile location in different ways. For example, when a UE 110 is used to call or text emergency services, AML sends the present physical location (geolocation) of the UE 110 to authorized emergency personnel (e.g., to a Public Safety Answering Point) free of charge. AML is typically implemented as an integrated setting of the UE 110 device, not as an application, or the like. For example, some phones implement AML in accordance with standards promulgated by the European Telecommunications Standards Institute (ETSI) Emergency Telecommunications Subcommittee (EMTEL).

As illustrated, in addition to the scheduler 215, embodiments of the base station 210 include a mapping database 222, a UE location monitor 224, a CQI reporting controller 220, and a staleness detector 226. Embodiments of the mapping database 222 include stored location-mapped CQI entries. The mapping database 222 can be implemented using any suitable type of data storage, such as remote storage (e.g., a remote server), distributed storage (e.g., cloud-based storage), local storage (e.g., one or more solid-state drives, hard disk drives, tape storage systems, etc.). Each location-mapped CQI entry represents a mapping between a respective CQI reporting location and a respective CQI score. The location-mapped CQI entries can be stored in any suitable manner. For example, each entry is an entry in a relational database that stores the CQI reporting locations in association with the CQI scores. The CQI score is generated from respective CQI information previously reported by one or more UEs 110 while in the respective CQI reporting location. In some implementations, each location-mapped CQI entry includes additional information. For example, the location-mapped CQI entries can include timestamp information (e.g., indicating a last time the respective CQI score was updated) and/or additional CSI information reported and/or computed for that location (e.g., signal power, resource block allocations, etc.).

In some implementations, each respective CQI score is a single CQI index value corresponding to the last-reported CQI index value for the respective CQI reporting location (e.g., reported by the UE 110, or by another UE 110 that was in that same CQI reporting location at the same or a different). In some implementations, the CQI score is a score computed from one or more CQI index values reported from the respective CQI reporting location. For example, the CQI score can represent an aggregate (e.g., or average, weighted average based on recency, etc.) of values over time from one or more UEs 110 in the CQI reporting location. In some embodiments, location-mapped CQI entries exist only for CQI reporting locations from which actual reporting data has previously been received. In other embodiments, interpolation techniques can be used to generate location-mapped CQI entries for CQI reporting locations from which no actual CQI reports were received. For example, a location-mapped CQI entry for a particular CQI reporting location can be generated with an estimated CQI score based on weighted averaging of nearest-neighboring location-mapped CQI entries (e.g., weighted based on distance, based on recency, etc.).

Embodiments of the UE location monitor 224 detect a present physical location of a UE 110 in communication with the base station 210. In some embodiments, the UE location monitor 224 continually monitors the location of the UE 110, such as using base station positioning techniques, GPS positioning techniques, AML techniques, etc. In some cases, the base station 210 can estimate or predict UE 110 locations based on extrapolation of trend data (e.g., extending a present UE trajectory forward in time), based on statistical analysis of past UE 110 location data, or in any other suitable manner. In other embodiments, the UE 110 continually monitors its own channel quality (e.g., using the CSI processor 234). When the channel quality falls below a predetermined threshold level, the UE 110 can obtain location data corresponding to its present physical location (e.g., from the locator 236) and can transmit the location data to the UE location monitor 224 of the base station 210. In other embodiments, the UE location monitor 224 monitors the location of the UE 110 to detect when the UE 110 is approximately in a location previously determined to have certain channel state characteristics; and the UE location monitor 224 requests more precise location data (e.g., AML data) from the locator 236 of the UE 110. In some implementations, the mapping database 222 can map channel quality over various locations based on previously reported CSI (as described below), and that information can be used to trigger a request by the UE location monitor 224 for AML data from the locator 236 of the UE 110. Some embodiments are configured so that the present physical location of the UE 110 is sent to the UE location monitor 224 of the base station 210 whenever the signal quality for the UE 110 falls below a predetermined threshold level (e.g., the reference signal received power (RSRP) falls below −90 dBm).

Embodiments of the CQI reporting controller 220 can communicate with the mapping database 222 and the UE location monitor 224 to determine when a UE 110 is in a location for which new or updated CSI is desired. The CQI reporting controller 220 can attempt to match the present physical location of the UE 110 (as detected by the UE location monitor 224) to a particular one of the location-mapped CQI entries stored in the mapping database 222. In some cases, the present physical location of the UE 110 matches a CQI reporting location of one of the location-mapped CQI entries, such that the matching successfully identifies a matching one of the location-mapped CQI entries. In other cases, the present physical location of the UE 110 does not match a CQI reporting location of any of the location-mapped CQI entries. In such cases, some implementations can generate a new location-mapped CQI entry for the CQI reporting location. Some such implementations generate the new location-mapped CQI entry with a blank respective CQI score, or by setting the respective CQI score to an initial default value. Other such implementations can generate the new location-mapped CQI entry with an estimated CQI score computed based on other existing location-mapped CQI entries. For example, as described above, the estimated CQI score can be computed based on weighted averaging of nearest-neighboring location-mapped CQI entries in the mapping database 222. In cases where a new location-mapped CQI entry is generated for the detected present physical location of the UE 110, the new location-mapped CQI entry can be used as the result of the attempted matching by the CQI reporting controller 220. For example, the result of the matching can be identification of a particular location-mapped CQI entry from the database, which can either be a location-mapped CQI entry that previously existed prior to the matching, or a new location-mapped CQI entry generated based on failure of the matching.

Terms like "present physical location" and "CQI reporting location" can refer to a particular location in a grid with a static or dynamic spatial resolution. For example, any location is "rounded" or "quantized" to a nearest location on a mapping grid, and the mapping grid has a particular associated spatial resolution. In some implementations, the spatial resolution is a maximum spatial resolution provided by the locator 236 technology (e.g., any location sensing technology can only provide a certain level of location accuracy). In other implementations, the spatial resolution is defined by a relevant cellular networking standard. In other implementations, the spatial resolution can adapt to local variance in CSI (e.g., in CQI score). For example, implementations can use a lower spatial resolution (i.e., grid points are spaced farther apart) for regions across which CQI and/or other CSI information is substantially consistent; while implementations can use a higher spatial resolution for regions across which CQI and/or other CSI information changes frequent and/or by large amounts. In a lower spatial resolution grid, UEs 110 in a larger set of physical locations will be considered as being in the same CQI reporting location; in a higher spatial resolution grid, UEs 110 in a smaller set of physical locations will be considered as being in the same CQI reporting location. In some implementations, the spatial resolution is established once, such as part of the RF system design for the network. In other implementations, the CQI reporting controller 220 is able to adjust the spatial resolution dynamically in response to detected temporal and geographic changes in CQI scores.

Embodiments of the CQI reporting controller 220 can determine whether the identified particular location-mapped CQI entry includes a stale respective CQI score. As described more fully below, the respective CQI score can be evaluated against a predetermined staleness threshold, which can indicate an amount of time, a confidence level, etc. In some embodiments, the staleness detection is performed by a separate staleness detector 226. In some embodiments the staleness detector 226 is implemented by the CQI reporting controller 220. As used herein, "staleness" generally refers to a measure of relevance of the CQI score. For example, as increasing time passes since a last CQI reports was received from a particular CQI reporting location for a long time, the location-mapped CQI entry corresponding to that CQI reporting location (particularly, the respective CQI score of that location-mapped CQI entry) can become less relevant.

When the CQI reporting controller 220 (or the staleness detector 226) determines that the particular location-mapped CQI entry matching the present physical location of the UE 110 (or generated to match the present physical location) is stale, the CQI reporting controller 220 can communicate a control message to the UE 110 to toggle the modem 230 into the active CQI reporting mode. As described above, the control message can direct the modem 230 to toggle the state of the CQI report flag 232 to the active CQI reporting mode setting. In some implementations, the control message is a radio resource control (RRC) message, which is a layer 3 protocol used in 5G NR (also in other RATs, like 4G LTE) to communicate control messages from the base station 210 to the UE 110. As described herein, the modem 230, CSI processor 234, and/or other components of the UE 110 can be configured (e.g., hard-coded) to compute and report a CQI value to the base station 210 responsive to the CQI reporting mode being set to active.

Responsive to sending the control message, the CQI reporting controller 220 can receive a CQI reporting message from the UE 110. In some implementations, the CQI reporting message includes a present CQI index as computed for the present physical location of the UE 110. In other implementations, additionally or alternatively, the CQI reporting message can include any suitable CSI information. Embodiments of the CQI reporting controller 220 can update the respective CQI score for the particular location-mapped CQI entry (i.e., the entry matching the present physical location of the UE 110) based on the CQI reporting message. The updating can include updating staleness information for the location-mapped CQI entry. For example, a newly updated or computed CQI score can be associated with an updated timestamp, a high confidence value, or the like.

In some implementations, the updating includes replacing the previous CQI score with a new CQI score indicating the newly reported CQI. In other implementations, the updating includes computing a new CQI based on the newly reported CQI information and previously reported CQI information. For example, the new and previous CQI information can be aggregated, averaged, and/or otherwise combined. In some implementations, the updating changes the existing CQI score for the particular location-mapped CQI entry only if the newly reported CQI information does not match the currently stored CQI score (e.g., in which case, the updating can update timing and/or other staleness-related information without updating the CQI score). In some implementations, the updating includes comparing the newly reported CQI information against the currently stored CQI score to determine if there is more than a predetermined threshold amount of difference (e.g., a maximum magnitude or percentage change in index value, etc.). In such cases, such implementations can trigger the UE 110 to provide another CQI reporting message (e.g., by waiting to toggle the CQI report flag 232 back to inactive mode, or by again toggling the CQI report flag 232 to active mode). This can be repeated until the CQI reporting controller 220 can either confirm that a dramatic change in CSI (at least in CQI) has occurred for that CQI reporting location, confirm that the newly reported CQI information was incorrect, etc.

As described above, some embodiments of the UE 110 are configured automatically to toggle back to the inactive CQI reporting mode after generating and communicating a CQI reporting message to the base station 210. In other embodiments, the UE 110 remains in the active CQI reporting mode until it receives another control message from the base station 210 that toggles the CQI report flag 232 back to the inactive CQI reporting mode. In some such embodiments, the CQI reporting controller 220 sends another control message (e.g., another RRC message) to the UE 110 to toggle the UE's 110 CQI report flag 232 back to the inactive CQI reporting mode in response to the CQI reporting controller 220 receiving the CQI reporting message. In other such embodiments, the CQI reporting controller 220 waits to send another control message to toggle the UE's 110 CQI report flag 232 back to the inactive CQI reporting mode until it has confirmed that the newly reported CQI information is correct, or has received multiple consistent (e.g., self-confirming) CQI reporting messages.

In effect, the UEs 110 are configured only to report CQI when they are detected to be in CQI reporting locations for which stored CQI information available to the base station 210 is stale. The staleness can be evaluated in different ways. In some implementations, each location-mapped CQI entry is associated with (e.g., the entry includes, is otherwise stored in association with, etc.) timing information indicating the last time the CQI score information was updated. The timing information can be represented as a timestamp of the last received CQI report associated with the respective CQI reporting location, or in any other suitable manner. In some such implementations, a particular CQI score is considered to be stale when the last update was longer than a predetermined amount of time ago as defined by the staleness threshold (e.g., two weeks, one month, etc.).

In some implementations, the predetermined staleness threshold is based on a confidence score associated with each location-mapped CQI entry, which can be a function of multiple variables. For example, certain implementations described above generate a new location-mapped CQI entry when the CQI reporting controller 220 fails to match a present physical location of the UE 110 to any already stored location-mapped CQI entries, and the new location-mapped CQI entry is generated with a default or zero CQI score. Such newly generated location-mapped CQI entries can be initially associated with a low enough confidence score to cause the CQI reporting controller 220 to send control message s to the UE 110 to toggle it to the active CQI reporting mode, thereby receiving an actual CQI report from the respective CQI reporting location. Similarly, certain implementations described above generate a new location-mapped CQI entry when the CQI reporting controller 220 fails to match a present physical location of the UE 110 to any already stored location-mapped CQI entries, and the new location-mapped CQI entry is generated based on stored location-mapped CQI entries having neighboring CQI reporting locations. In some such implementations, the newly generated location-mapped CQI entries are always initially associated with a confidence score that is low enough to cause the CQI reporting controller 220 to send control message s to the UE 110 to toggle it to the active CQI reporting mode, thereby receiving an actual CQI report from the respective CQI reporting location. In other such implementations, the newly generated location-mapped CQI entries is also associated with an initial confidence score based, for example, on physical proximity between the present physical location of the UE 110 and the CQI reporting locations of stored location-mapped CQI entries used to estimate the initial CQI score for the new location-mapped CQI entry, or on local variance in CQI scores around the present physical location of the UE 110 (e.g., in regions with highly consistent CQI scores across all nearby CQI reporting locations, there may be a high initial confidence in the estimated CQI score). In such implementations, the initial confidence score may be high enough that the estimated CQI score for that CQI reporting location is treated as if it were actually reported by a UE 110, and no further reporting may be requested at that time.

In some implementations, the confidence score and/or the corresponding staleness determination is based on consistency of CQI reports from the respective CQI reporting location over time. For example, the staleness threshold associated with each location-mapped CQI entry may initially result in more frequent CQI reports being requested from UEs 110. For example, if a UE 110 is detected at the CQI reporting location and more than a few hours, a day, etc. has passed, the CQI reporting controller 220 will send control messages to toggle the UE 110 to the active CQI reporting mode. Over time, particularly if the CQI reports from a particular CQI reporting location are consistent (e.g., identical, or within a predetermined threshold of similarity to each other), the staleness threshold can automatically adjust to allow for longer periods of time between each CQI reporting request by the base station 210. For example, the staleness threshold can gradually increase until CQI scores only become stale after a month.

In some implementations, the confidence scores and/or staleness determination accounts for the CQI score itself. For example, some implementations can direct UEs 110 to report CQI more frequently in CQI reporting locations with higher CQI scores, as such locations may be less impacted by the threshold reduction from the reporting. Alternatively, some implementations can direct UEs 110 to report CQI more frequently in CQI reporting locations with lower CQI scores (e.g., though less frequently than in conventional approaches), as UEs 110 in such locations may be more impacted by changes in CQI and may benefit more from dynamic channel adjustments by the scheduler 215, or other components. In some implementations, the confidence scores and/or staleness determination accounts for local variance of in CQI score. For example, in a large outdoor region with a fairly clear path to the nearest base station tower 115, there may be many CQI reporting locations with the same, or substantially the same, CQI scores. In contrast, a dense urban region of the same size, with many buildings and/or other sources of potential signal interference and channel degradation, there may be large and/or frequent changes in CQI scores over that region. Some implementations can adapt the confidence scores and/or staleness determination so that, in regions with less CQI score variance, CQI reporting is less frequent and/or at a lower spatial resolution (e.g., fewer location-mapped CQI entries are used to represent CQI reporting locations for the entire region).

Features of embodiments described herein can be applied both to mobile UEs 110 and to fixed-location UEs 110 (i.e., for which the present physical location remains substantially constant over time). For either type of UE 110, the CQI reporting controller 220 can control CQI reporting frequency by remotely controlling toggling of CQI reporting mode.

Embodiments of the scheduler 215, CQI reporting controller 220, UE location monitor 224, staleness detector 226, and other components can be implemented with and/or can include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random-access memory (RAM), flash memory, a hard disk drive (HDD), or a solid-state drive (SSD).

Figure 3:
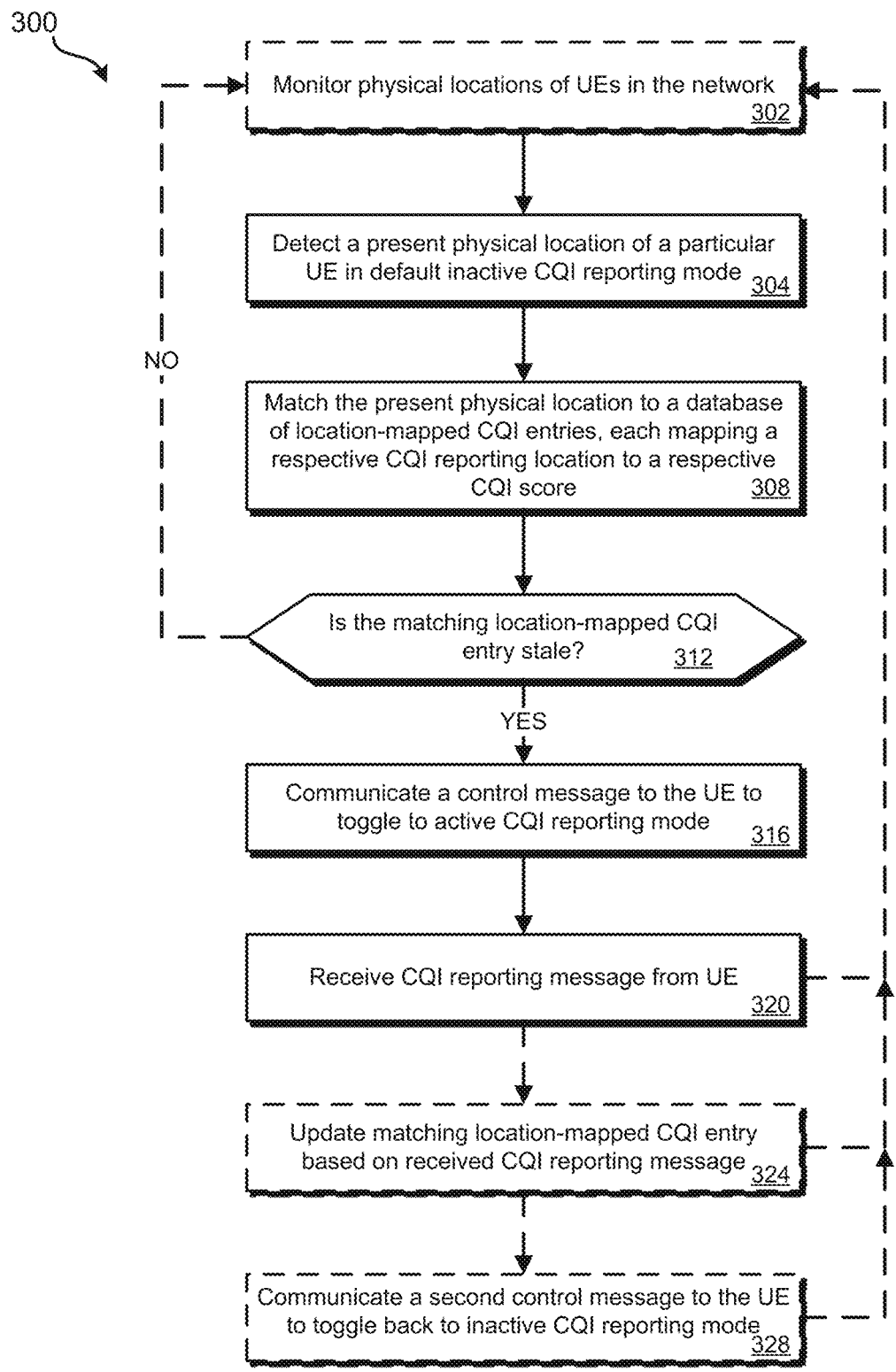
FIG. 3 shows a flow diagram of an illustrative method for selective location-based activation of channel quality indicator reporting by user equipment in a radio communication network, according to various embodiments described herein.

FIG. 3 shows a flow diagram of an illustrative method 300 for selective location-based activation of CQI reporting by UEs (e.g., mobile terminals) in a radio communication network, according to various embodiments described herein. Embodiments of the method 300 can operate in context of the cellular network 200 of FIG. 2, or any suitable radio network and/or radio access technology. As described herein, the network includes one or more base stations in communication with one or more UEs at any particular time. For the sake of clarity, the method 300 focuses on communications between any one of the base stations ("the base station) and any one of the UEs ("the UE"), but the method 300 can be similarly applied across all base stations and/or all UEs of the network. For example, in a typical real-world scenario, the method 300 can be executed concurrently with respect to many (e.g., thousands or more) of RF communication channels between base stations and UEs.

Embodiments of the method 300 can begin at stage 304 by detecting (e.g., by the base station) a present physical location of the UE. As described herein, each of the UEs is configured to be toggled by the base station into either of an active CQI reporting mode or an inactive CQI reporting mode. For example, a RAT-compatible modem in the UE includes a CQI report flag that can be toggled, based on a remote control signal from the base station, between the active and inactive CQI reporting modes. In the active CQI reporting mode, the UE reports CQI to the base station. In the inactive CQI reporting mode, the UE does not report CQI to the base station. The UE can be configured so that the inactive CQI reporting mode is the default mode. In some cases, a UE toggled into the active CQI reporting mode automatically reverts (toggles) back to the inactive CQI reporting mode after CQI reporting (or after some amount of time, some number of CQI reports, etc.). In other cases, the UE only toggles between CQI reporting modes based on explicit remote command signaling from the base station.

Some embodiments of the method 300 begin prior to stage 304, at stage 302, by continually monitoring the physical locations of some or all UEs. For example, at any time, each base station is in communication with some subset of the UEs in the cellular network, and each base station can continually monitor the physical locations of each of its subset of UEs. In some embodiments, the detecting at stage 304 includes, or is triggered by, receiving a location update message from the UE to indicate the present physical location of the UE. According to embodiments described herein, the location update message can be sent to the base station based on a position fixing event associated with the CQI reporting. In some implementations, the base station can estimate the location of the UE as in or near a location for which new or updated CQI information is needed, and the base station can send a request to the UE for the location update message. In other implementations, the UE can detect that it is in a location where its present CQI index (or other computed SINR, RSRP, etc.) is below a predetermined threshold level, and the UE can send the location update message to the base station, accordingly. In some implementations, the location update message includes AML information. Conventionally, UEs may be configured only to communicate AML information only in connection with use of the UE to call or text emergency services. However, some embodiments described herein can exploit such AML information for on-demand position fixing.

At stage 308, embodiments can match (e.g., by the base station) the present physical location (the detected location of the UE) to a particular one of multiple (e.g., millions) of stored location-mapped CQI entries. The location-mapped CQI entries are stored in a mapping database and each represents a mapping between a respective CQI reporting location and a respective CQI score. Each respective CQI score is generated from respective CQI information previously reported by one or more UE devices (e.g., only the UE, the UE and other UEs, only other UEs, etc.) while previously in the respective CQI reporting location. As described above, the matching in stage 308 may successfully find an existing location-mapped CQI entry for which the respective CQI reporting location matches the present physical location of the UE, or the matching may not find any location-mapped CQI entries with matching respective CQI reporting locations. In the latter case, the matching can include generating and storing a new location-mapped CQI entry to have a CQI reporting location corresponding to the present physical location of the UE.

At stage 312, embodiments can determine (e.g., by the base station) whether the respective CQI score of the particular location-mapped CQI entry is stale. As described above, the staleness of a location-mapped CQI entry is a measure of its assumed relevance to present channel conditions. For example, over time, any particular CQI score previously generated for a particular CQI reporting location will tend to become less of a reliable predictor of the present CQI for that CQI reporting location, and therefore less relevant to present scheduling and/or other determinations that are based on present channel quality. In some cases, the determination at stage 312 will be that the location-mapped CQI entry does not include stale data, such that the base station can reliably use an already stored location-mapped CQI entry to make scheduling and/or other determinations for UEs in the respective CQI reporting location (i.e., new CQI reports are not yet needed for that location). In other cases, the determination at stage 312 will be that the location-mapped CQI entry does include stale data, such that it is desirable to obtain updated CQI information for the respective CQI reporting location.

If the determination at stage 312 is that the particular location-mapped CQI entry is not stale, embodiments can end. In some implementations, in such a case, the method 300 can return to stage 302 to continue monitoring the locations of UEs. If the determination at stage 312 is that the particular location-mapped CQI entry is stale, embodiments can proceed to stage 316. At stage 316, embodiments can communicate (e.g., by the base station) a control message to the UE to toggle the UE to the active CQI reporting mode responsive to the determining in stage 312. As described above, toggling the UE to active CQI reporting mode causes the UE to report CQI to the base station. The control message can be a RRC message, or any other suitable manner of remotely controlling the mode state of the UE.

At stage 320, embodiments can receive (e.g., by the base station) a CQI reporting message from the UE, responsive to the UE toggling to the active CQI reporting mode. The CQI reporting message can indicate a present spectral efficiency experienced by the mobile terminal at the present physical location. In some embodiments, CQI is computed and the CQI reporting message is generated and transmitted in a manner defined by relevant technical specification standards for the RAT (i.e., except for modifications to timing, triggering, etc., as described herein). In some such embodiments, when the UE is toggled to active CQI reporting mode, the UE can also report other CSI. In such embodiments, terms, such as "CQI reporting," "CQI reporting message," and the like can refer more generally to reporting of CSI.

Some embodiments of the method 300 can proceed, at stage 324, by updating (e.g., by the base station) the respective CQI score for the particular location-mapped CQI entry based on the CQI reporting message. As described above, such updating can include replacing the existing CQI score, updating (e.g., recomputing) the CQI score based on the newly reported information, confirming the reliability of the newly reported CQI information, etc. Some embodiments of the method 300 can proceed, at stage 328, by communicating (e.g., by the base station) a second control message to the UE, responsive to receiving the CQI reporting message, to toggle the UE back to the inactive CQI reporting mode (e.g., where such toggling back to the inactive CQI reporting mode is not automatic).

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for implementation in a base station for selective location-based activation of channel quality indication (CQI) reporting by mobile terminals in a wireless communication network, the system comprising:
   a user equipment (UE) location monitor to detect a present physical location of a mobile terminal of a plurality of user equipment (UE) devices in communication with the base station, each of the plurality of UE devices configured to be toggled by the base station into either of an active CQI reporting mode or an inactive CQI reporting mode;
   a mapping database having, stored thereon, a plurality of location-mapped CQI entries, each being a mapping between a respective CQI reporting location and a respective CQI score generated from respective CQI information previously reported by one or more UE devices while in the respective CQI reporting location;
   a CQI reporting controller coupled with the UE location monitor and the mapping database to:
      match the present physical location to a particular location-mapped CQI entry of the plurality of location-mapped CQI entries;
      determine whether the respective CQI score of the particular location-mapped CQI entry is stale;
      communicate a control message to the mobile terminal to toggle the mobile terminal to the active CQI reporting mode in response to the staleness detector determining that the respective CQI score of the particular location-mapped CQI entry is stale; and
      receive a CQI reporting message from the mobile terminal, responsive to the mobile terminal toggling to the active CQI reporting mode, the CQI message indicating a present spectral efficiency experienced by the mobile terminal at the present physical location.

2. The system of claim 1, wherein the CQI reporting controller is further to:
   update the respective CQI score for the particular location-mapped CQI entry based on the CQI reporting message.

3. The system of claim 1, wherein the control message is a first control message, and the CQI reporting controller is further to:
   communicate a second control message to the mobile terminal, responsive to receiving the CQI reporting message, to toggle the mobile terminal to the inactive CQI reporting mode.

4. The system of claim 1, wherein:
   each of the plurality of location-mapped CQI entries includes a respective age indicating an elapsed time since the respective CQI score was last updated; and
   the CQI reporting controller is to determine whether the respective CQI score of the particular location-mapped CQI entry is stale by determining that the respective age of the particular location-mapped CQI entry is greater than a predetermined staleness age threshold.

5. The system of claim 1, wherein the UE location monitor is to detect the present physical location by:
   transmitting a UE location fixing message to the mobile terminal; and
   receiving an advanced mobile location update message from the mobile terminal that indicates the present physical location in response to the UE location fixing message.

6. The system of claim 1, wherein:
   the mobile device is configured to transmit an advanced mobile location update message to the base station responsive to detecting that the present physical location has a local spectral efficiency below a predetermined threshold; and
   the UE location monitor is to detect the present physical location based on receiving the advanced mobile location update message from the mobile terminal to indicate the present physical location.

7. The system of claim 1, wherein:
   the CQI reporting controller is to match the present physical location by determining whether the present physical location matches the respective CQI reporting location of any of the plurality of location-mapped CQI entries; and
   the CQI reporting controller is further to generate and store the particular location-mapped CQI entry as a new location-mapped CQI entry in the mapping database in response to determining that the present physical location does not match the respective CQI reporting location of any of the plurality of location-mapped CQI entries, the particular location-mapped CQI entry generated to have the present physical location as the respective CQI reporting location.

8. The system of claim 1, wherein each respective CQI score is computed from an aggregate of CQI information previously reported by the mobile device at multiple previous occurrences of the mobile device being in the respective CQI reporting location.

9. The system of claim 1, wherein each respective CQI score is computed from an aggregate of CQI information previously reported by multiple UE devices while the multiple UE devices were in the respective CQI reporting location.

10. The system of claim 1, wherein the control message is a radio resource control reconfiguration message.

11. The system of claim 1, wherein the CQI reporting message is generated by the mobile terminal based on computing a signal-to-noise ratio of a channel state information reference signal received by the mobile terminal from the base station at the present physical location.

12. A method for selective location-based activation of channel quality indication (CQI) reporting by mobile terminals in a wireless communication network having a plurality of base stations, the method comprising:
  detecting, by a base station of the plurality of base stations, a present physical location of a mobile terminal of a plurality of user equipment (UE) devices in communication with the base station, each of the plurality of UE devices configured to be toggled by the base station into either of an active CQI reporting mode or an inactive CQI reporting mode;
  matching the present physical location, by the base station, to a particular location-mapped CQI entry of a plurality of location-mapped CQI entries stored in a mapping database, each of the plurality of location-mapped CQI entries being a mapping between a respective CQI reporting location and a respective CQI score generated from respective CQI information previously reported by one or more UE devices while in the respective CQI reporting location;
  determining, by the base station, that the respective CQI score of the particular location-mapped CQI entry is stale;
  communicating a control message, by the base station to the mobile terminal, to toggle the mobile terminal to the active CQI reporting mode responsive to the determining; and
  receiving a CQI reporting message, by the base station from the mobile terminal, responsive to the mobile terminal toggling to the active CQI reporting mode, the CQI message indicating a present spectral efficiency experienced by the mobile terminal at the present physical location.

13. The method of claim 12, further comprising:
  updating the respective CQI score for the particular location-mapped CQI entry based on the CQI reporting message.

14. The method of claim 12, wherein the control message is a first control message, and further comprising:
  communicating a second control message, by the base station to the mobile terminal, responsive to receiving the CQI reporting message, to toggle the mobile terminal to the inactive CQI reporting mode.

15. The method of claim 12, wherein:
  the determining comprises determining whether the respective CQI score of the particular location-mapped CQI entry is stale; and
  the communicating and the receiving are performed only in response to determining that respective CQI score of the particular location-mapped CQI entry is stale.

16. The method of claim 12, wherein each of the plurality of UE devices is configured to default to the active CQI reporting mode, and only to toggle to the inactive CQI reporting mode responsive to messaging by any of the plurality of base stations.

17. The method of claim 12, wherein:
  each of the plurality of location-mapped CQI entries includes a respective age indicating an elapsed time since the respective CQI score was last updated; and
  the determining comprises determining that the respective age of the particular location-mapped CQI entry is greater than a predetermined staleness age threshold.

18. The method of claim 12, wherein the detecting comprises receiving an advanced mobile location update message from the mobile terminal to indicate the present physical location.

19. The method of claim 12, wherein:
  the mobile device is configured to transmit an advanced mobile location update message to the base station responsive to the mobile device computing a CQI value at the present physical location as below a predetermined threshold; and
  the detecting comprises receiving the advanced mobile location update message from the mobile terminal to indicate the present physical location.

20. The method of claim 12, wherein the matching the present physical location comprises determining whether the present physical location matches the respective CQI reporting location of any of the plurality of location-mapped CQI entries, and further comprising:
  generating and storing the particular location-mapped CQI entry as a new location-mapped CQI entry in the mapping database in response to determining that the present physical location does not match the respective CQI reporting location of any of the plurality of location-mapped CQI entries, the particular location-mapped CQI entry generated to have the present physical location as the respective CQI reporting location.

21. The method of claim 20, wherein:
  the generating and storing comprises:
    identifying a set of the plurality of location-mapped CQI entries as having respective CQI reporting locations that are within a predetermined physical distance from the present physical location;
    computing the initial respective CQI score by interpolating the respective CQI scores of the set of the plurality of location-mapped CQI entries; and
    computing a confidence value associated with the interpolating; and
  the determining comprises determining whether the initial respective CQI score of the particular location-mapped CQI entry is stale based on the confidence value.

* * * * *